US012644573B2

(12) United States Patent
Gromfeld

(10) Patent No.: US 12,644,573 B2
(45) Date of Patent: Jun. 2, 2026

(54) MOTOR VEHICLE LIGHTING DEVICE

(71) Applicant: VALEO VISION, Bobigny (FR)

(72) Inventor: Yves Gromfeld, Bobigny (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 19/071,971

(22) Filed: Mar. 6, 2025

(65) Prior Publication Data

US 2025/0198586 A1 Jun. 19, 2025

Related U.S. Application Data

(63) Continuation of application No. 18/257,481, filed as application No. PCT/EP2021/086324 on Dec. 16, 2021, now Pat. No. 12,270,522.

(30) Foreign Application Priority Data

Dec. 18, 2020 (FR) ...................................... 2013631

(51) Int. Cl.
*F21S 41/265* (2018.01)
*F21S 41/24* (2018.01)
(Continued)

(52) U.S. Cl.
CPC ............. *F21S 41/663* (2018.01); *F21S 41/24* (2018.01); *F21S 41/265* (2018.01);
(Continued)

(58) Field of Classification Search
CPC ........ F21S 41/265; F21S 41/33; F21S 41/295; F21S 41/29; F21W 2103/55;
(Continued)

(56) References Cited

U.S. PATENT DOCUMENTS 7,210,834 B2 5/2007 Sazuka et al.
7,621,664 B2 11/2009 Nicolai
(Continued)

FOREIGN PATENT DOCUMENTS

EP 1770328 A1 4/2007
EP 3480515 A1 5/2019
(Continued)

OTHER PUBLICATIONS

European Patent Office, International Search Report (with English translation) and Written Opinion of corresponding PCT Application No. PCT/EP2021/086324 dated Mar. 30, 2022.

*Primary Examiner* — Omar Rojas Cadima
(74) *Attorney, Agent, or Firm* — Valeo Vision

(57) ABSTRACT

A motor vehicle lighting device including a housing with a first module for emitting a first beam, a second module for emitting a second beam, extending above the first, a third module for emitting a third segmented beam, extending above the second beam, and an optical projection system. The second module is arranged below the first module, the third module is arranged below the second module, and each of the modules includes a plurality of light sources, a collector for collecting and reflecting the rays emitted by the plurality of light sources into a beam, and a portion of the optical projection system that is arranged to project the beam, the portion forming an image of the collector.

13 Claims, 5 Drawing Sheets

(51) Int. Cl.

| | |
|---|---|
| ***F21S 41/33*** | (2018.01) |
| ***F21S 41/47*** | (2018.01) |
| ***F21S 41/663*** | (2018.01) |
| *F21S 41/141* | (2018.01) |

(52) U.S. Cl.
CPC ............ *F21S 41/334* (2018.01); *F21S 41/47* (2018.01); *F21S 41/141* (2018.01)

(58) Field of Classification Search
CPC ... B60Q 1/0041; F21V 29/503; F21V 29/504; F21V 29/505; F21V 29/507
See application file for complete search history.

(56) References Cited

U.S. PATENT DOCUMENTS

| | | | | |
|---|---|---|---|---|
| 9,157,597 | B2 | 10/2015 | Gürtl et al. | |
| 10,309,606 | B2 | 6/2019 | Takada et al. | |
| 10,539,313 | B2 | 1/2020 | Williams et al. | |
| 10,851,958 | B2 | 12/2020 | Gromfeld | |
| 12,270,522 | B2 * | 4/2025 | Gromfeld ............... | F21S 41/40 |
| 2009/0027909 | A1 * | 1/2009 | Albou ................... | F21S 41/323 362/517 |
| 2017/0211775 | A1 * | 7/2017 | Potter ..................... | F21S 41/36 |
| 2019/0383480 | A1 * | 12/2019 | Williams ................ | F21S 45/47 |

FOREIGN PATENT DOCUMENTS

| | | | |
|---|---|---|---|
| EP | 3521691 | A1 | 7/2019 |
| FR | 2858043 | A1 | 1/2005 |

* cited by examiner

[Fig. 1]
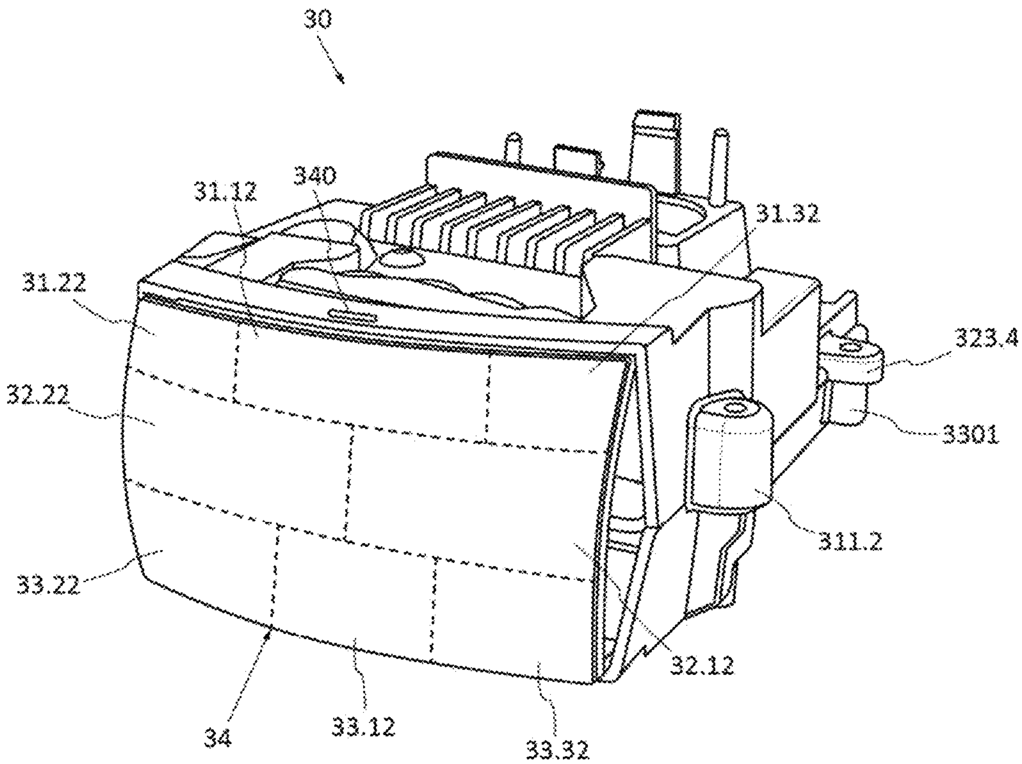
[Fig. 2]
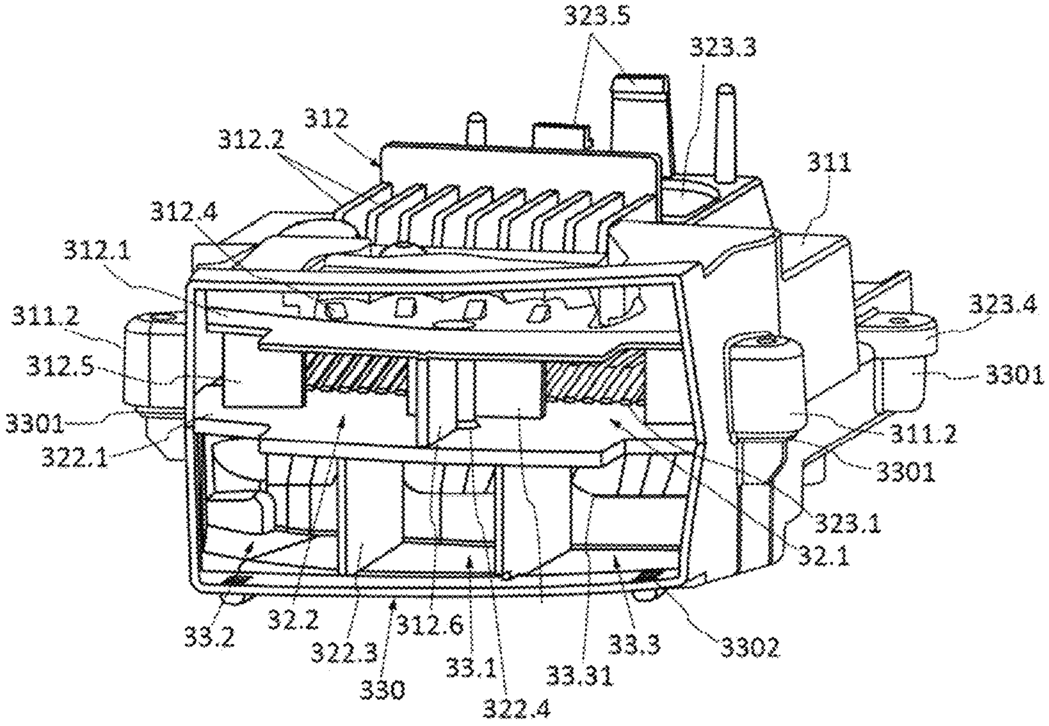

[Fig. 3]
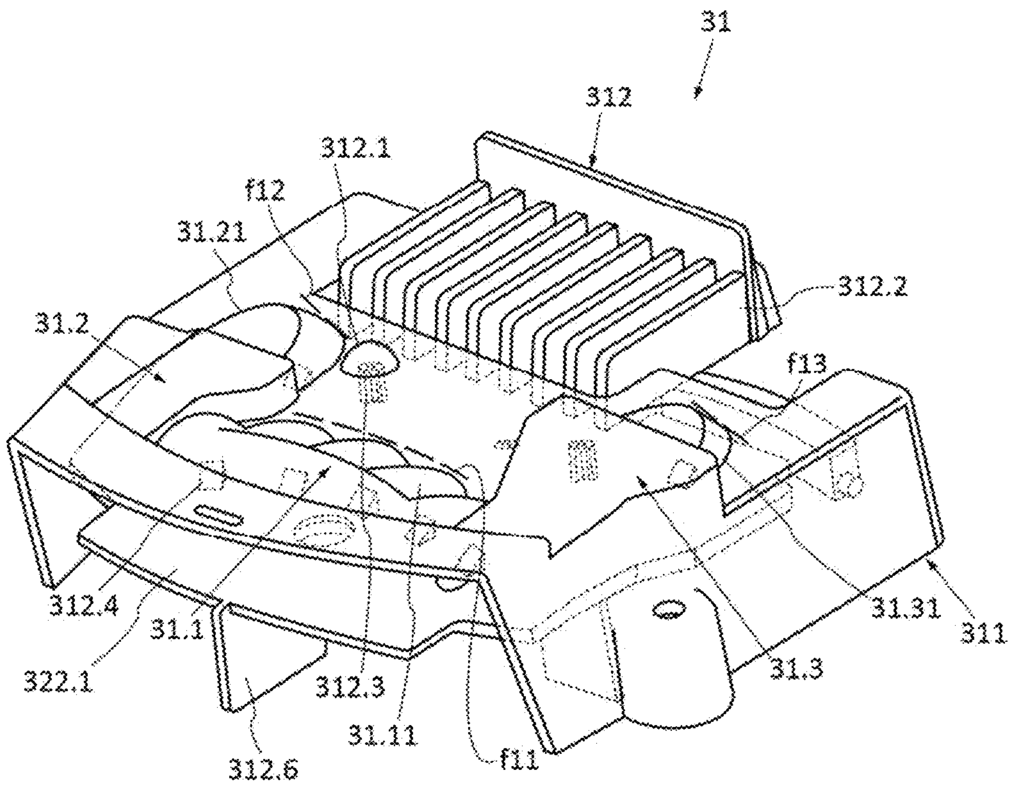
[Fig 4]
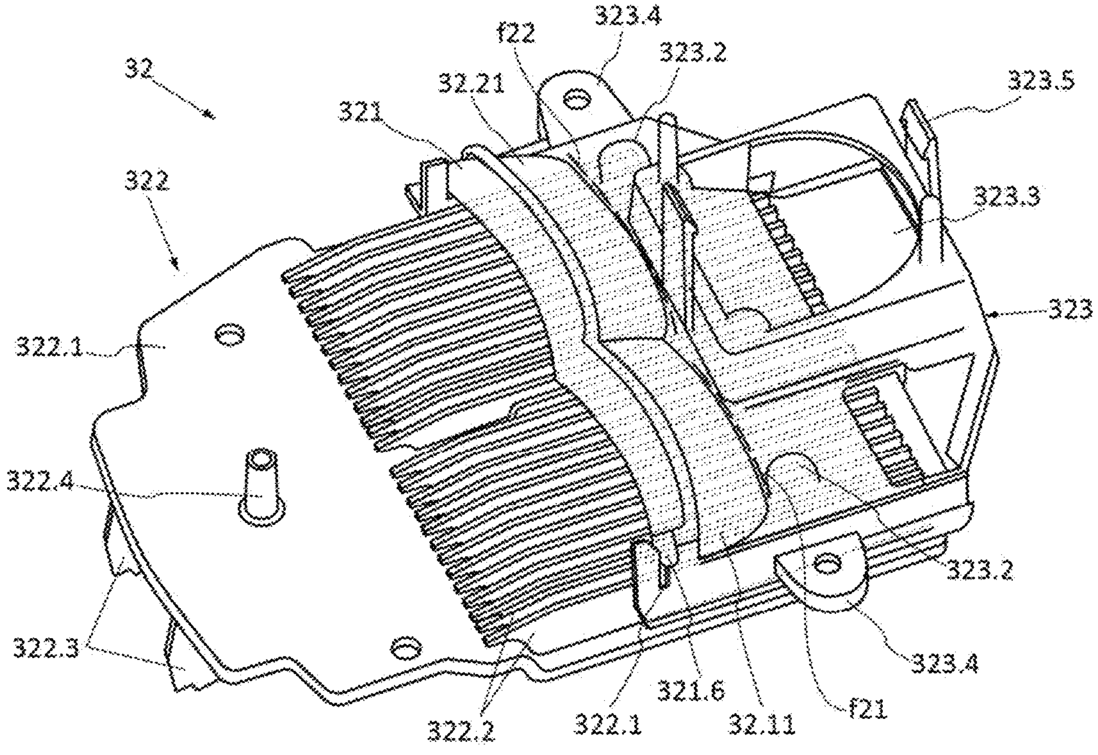

[Fig 5]
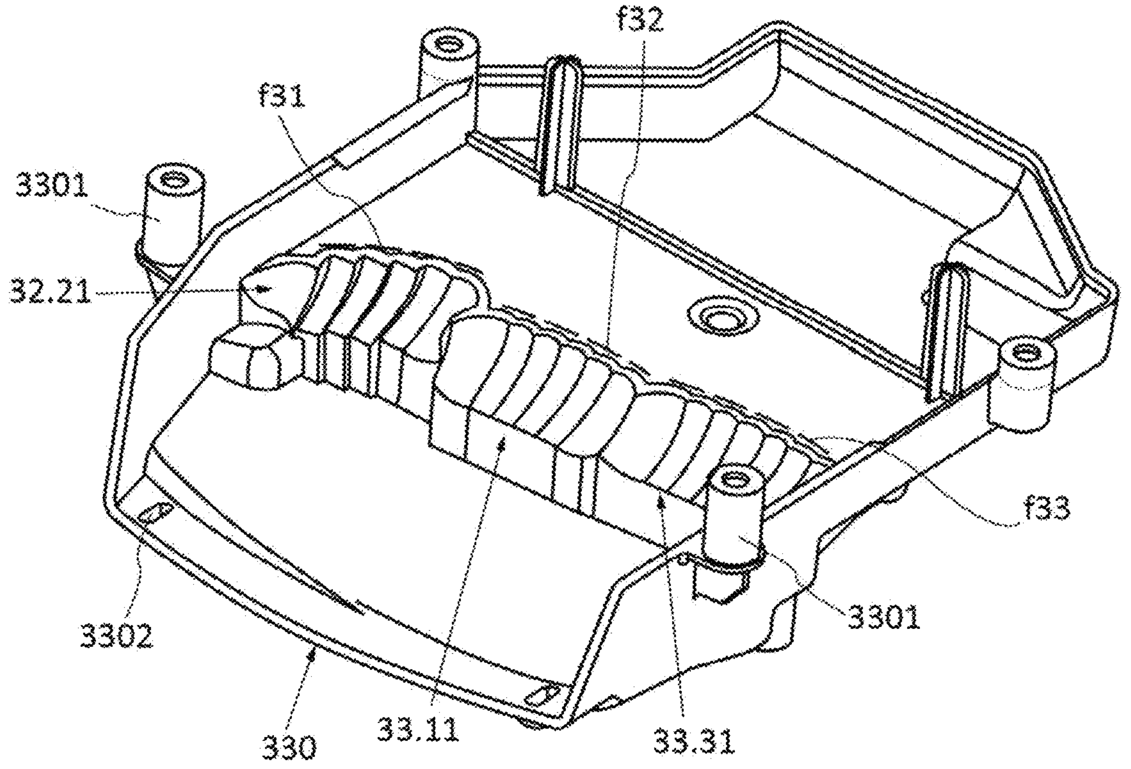
[Fig 6]
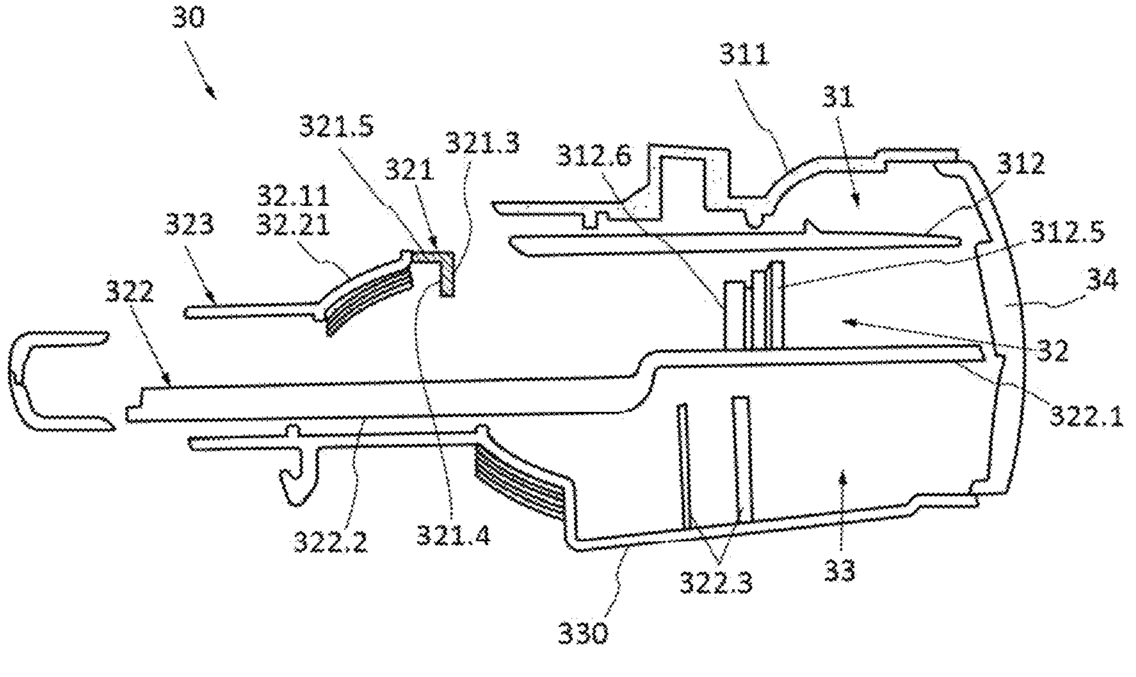

[Fig 7]
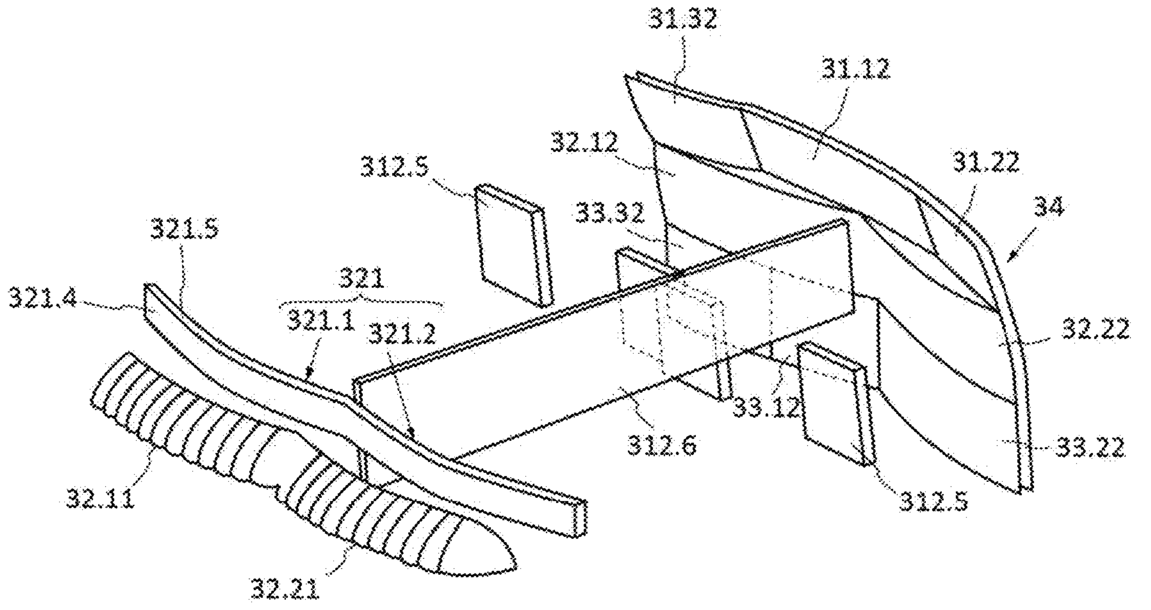
[Fig 8]
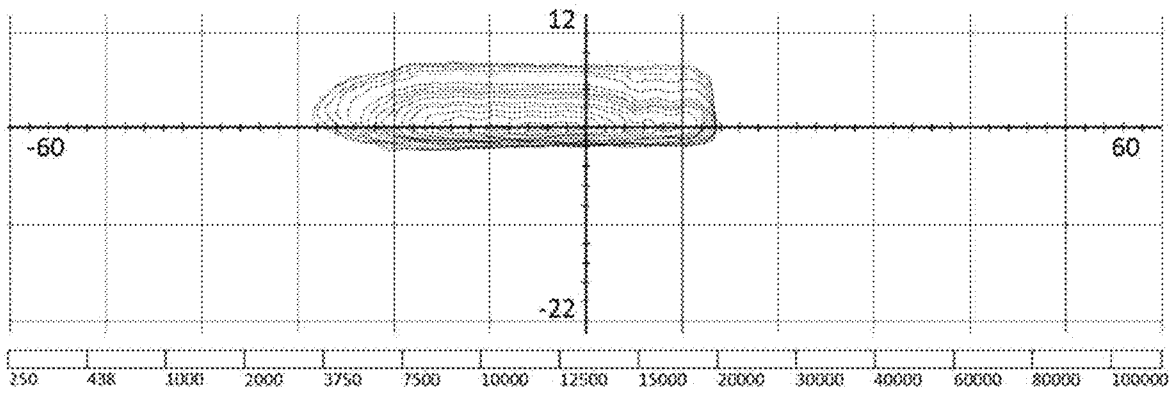
[Fig 9]
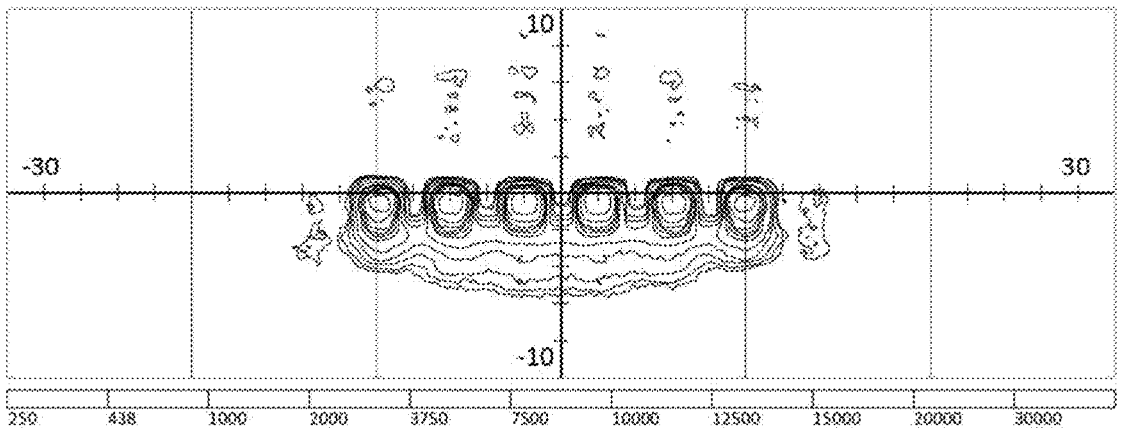

[Fig 10]
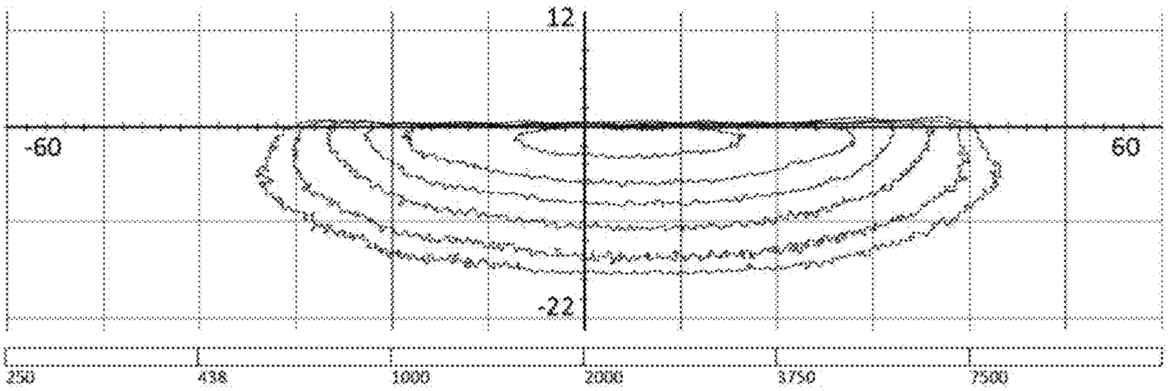

MOTOR VEHICLE LIGHTING DEVICE

TECHNICAL FIELD

The invention relates to the field of lighting and light signaling, and more particularly in the field of motor vehicles.

The invention relates to the technical field of lighting and light signaling.

BACKGROUND OF THE INVENTION

In the field of motor vehicle lighting, it is generally known practice to use optical devices comprising a light source, a collector with a reflective surface, an optical system of the lens type, and a shield positioned between the collector and the lens. In this type of device, the rays of light reflected by the collector are partially intercepted by the shield before being projected by the lens, the edge of the shield thus forming a cut-off for the beam of light that is projected.

However, this type of device necessitates the use of a lens with a significant focal length, and a collector of significant dimensions. If there is a desire to reduce the focal length while maintaining the same optical power, it is necessary to increase the size of the lens. However, if there is a desire to use a device comprising several lighting modules with the desire to superpose these, for example for aesthetic reasons, then the lighting device becomes bulky and is unable to fit in the restricted space assigned to it in the motor vehicle.

It is an objective of the invention to propose a lighting module that allows the use of a plurality of modules in the one same housing the volume of which is compact so that it can be positioned in a restricted space.

SUMMARY OF THE INVENTION

The invention relates to a motor vehicle lighting device, the device comprising a housing in which there are arranged at least a first lighting module designed to emit a first beam of light with a flat cut-off, a second lighting module designed to emit a second beam of light extending at least partially above the first beam of light, a third lighting module designed to emit a segmented beam of light, each segment of which can be controlled selectively, the third beam of light extending at least partially above the second beam of light, an optical projection system common to the first, second and third modules.

The device is notable in that the second lighting module is arranged in the housing below the first lighting module, in that the third lighting module is arranged in the housing below the second lighting module and in that each of the first, second and third lighting modules comprises a plurality of light sources, a collector comprising a reflective surface configured to collect the rays of light emitted by the plurality of light sources and reflect them as a beam of light, a portion of the optical projection system configured to project said beam of light; said portion being configured to form an image of the reflective surface of the collector.

The first and the second lighting modules correspond for example to the beams of light usually employed for regulation lighting of the low beam type. The third lighting module is notably segmented so that each segment of said module can be controlled selectively, making it possible to create a lighting function of the non-dazzling high beam type. The first lighting module may be positioned on the second lighting module itself positioned on the third lighting module. The optical system may be a lens, positioned at the front of the device and common to the three lighting modules. The optical system may also be a reflector or a combination of one or more reflectors and of one or more lenses. It is the projection system that allows the beams of light emitted by the light sources to be projected onto the road.

Each lighting module comprises a plurality of light sources and a collector comprising a reflective surface. The light collector is positioned in line with the light sources so as to collect the beam of light produced by the light sources and send it to the optical system, which is itself suitable for projecting the beam of light onto the road. Thanks to the invention, it is thus possible to create lighting functions requiring a beam of light having an upper cut-off, without using a shield. Consequently, it is possible to reduce the dimensions of the collector of each module and the dimension of the optical projection system, notably the vertical dimensions of these, so that the lighting modules can be stacked in order, for example, to meet an aesthetic requirement, while at the same time making the device more compact.

Further advantageous features of the invention are listed herein below. Each of these features may be considered alone or in combination with the notable features defined herein below. Each of these features contributes, as appropriate, to solving specific technical problems defined earlier on in the description, to which problems the notable features defined hereinabove do not necessarily contribute.

Advantageously, the collector of each of the first, second and third lighting modules comprises a plurality of sectors, each sector being configured to collect and reflect the rays of light emitted by at least one of the light sources of said module with which it is associated, said portion of the optical system of this module being configured to form an image of each sector. It will be appreciated that each sector defines, on its own, a part of the beam of light emitted by one of the modules.

Advantageously, the plurality of sectors of each collector are positioned transversely relative to one another. The sectors may have a truncated parabolic profile. In one example, in at least one, or even in each, of the modules, a single light source is associated with each sector of each collector, which is to say that the lighting module comprises as many light sources as there are sectors in the collector. Where appropriate, the light sources extend transversely with respect to an optical axis of the optical projection system. For example, in the one same collector, two adjacent sectors may have a common lateral edge.

Advantageously, each sector of the collector of each of the first, second and third lighting modules has a rear edge and said portion of the optical system of this module has a focal line situated in the vicinity of the rear edges of said sectors of the collector of this module so that the image of each sector that is formed by this portion has an upper cut-off that is formed by the rear edge of this sector. What is notably meant by a focal line situated in the vicinity of the rear edges of the sectors is a focal line that is situated at a distance of less than 10 mm from said rear edges.

Each sector of the collector of the first lighting module has a rear edge, a front edge and two lateral edges and wherein said first portion of the optical system has a focal line situated in the vicinity of the rear edges of said sectors so that the image of each sector that is formed by this first portion has an upper cut-off that is formed by the rear edge of this sector, and two lateral cut-offs that are each formed by at least a part of one of the lateral edges of this sector.

Advantageously, the first lighting module comprises a first submodule comprising the plurality of light sources, the collector and said portion, and two other submodules which are arranged one on each side of the first submodule of the first module, each of these submodules comprises a light source, a collector comprising a reflective surface configured to collect the rays of light emitted by the light source and reflect them as a beam of light; a portion of the optical projection system configured to project said beam of light; said portion being configured to form an image of the reflective surface of the collector and said portions of the optical projection system of these other submodules are arranged one on each side of the portion of the optical projection system of the first submodule of the first module.

According to one exemplary embodiment of the invention, the collector of the first submodule comprises five sectors, and the collectors of the other submodules which are positioned one on each side of this first submodule each comprise a single sector. Advantageously, the submodules of the first lighting module are configured to each emit a sub-beam of light having a substantially flat cut-off, these cut-offs being substantially aligned.

Advantageously, the collectors of each submodule of the first module form a first single component, forming a cover of the housing of the lighting device.

Advantageously, the device comprises a first heatsink separating the first and second modules, wherein the light sources of each of the submodules of the first lighting module are mounted on a first common support, said first support being a mounting plate of the first heatsink.

Advantageously, the first heatsink has heat-dissipating fins, for example arranged at one end of the mounting plate of the first heatsink, and the first single component comprises a recess, in which recess the fins of the first heatsink are arranged. The light sources produce heat that is conducted by the mounting plate to the fins so that the heat can be dissipated.

Advantageously, the common support comprises a plurality of blocking members each arranged in line with one of the light sources of each of the submodules of the first module. The blocking members may for example be shields to prevent direct light from the light source from passing through the optical system and prevent the creation of a spot of light. For example, the blocking members may take the form of triangular prisms.

In one embodiment of the invention, the second lighting module comprises a first diffusing screen interposed between said portion of the optical projection system of the second lighting module and the collector of the second lighting module.

The first diffusing screen may have a front face, facing toward the first portion of the optical projection system, and a rear face, facing toward the collector of the second lighting module. The rear face faces toward the collector of the second lighting module, and it is this face that receives the beams of light passed on by said collector of the second lighting module. The front face of the first screen faces toward said optical system, which is to say that it is this face that projects the image of the collector onto the optical projection system. The front and rear faces of the first screen have a succession of concave features and of convex features respectively. Each of these front and rear faces are provided with a plurality of torus shapes. The first screen may enable the production of a beam of light in the shape of an inverted "T". The inverted "T" shape may be formed by the horizontal diffusion of the beam of light by the diffusing screen.

The first diffusing screen may extend between an upper part of said collector and said portion of the optical system that has a focal line situated in the vicinity of the rear edges of said sectors of said collector. Where appropriate, the first diffusing screen may be configured to intercept and deflect only rays of light emitted by each first light source and reflected by an upper part of the sector of the collector of the second lighting module associated with this first light source.

For example, the first screen has an upper lip projecting from the rest of this screen toward the collector of the second lighting module, the first screen being configured so that this upper lip adjoins an upper edge of the collector of the second lighting module. The lip may have a sinusoidal shape similar to the front and rear faces of the diffusing screen and may coincide with the upper front edge of the collector of the second lighting module.

Advantageously, the device comprises a supporting mounting plate on which the first screen and the collector of the second lighting module are mounted.

If desired, the supporting mounting plate has an orifice, said orifice collaborating with the pin of the screen.

Advantageously, the second lighting module comprises a first submodule comprising the plurality of light sources, the collector, the first screen and said portion of the optical projection system, and at least a second submodule, this submodule comprises a plurality of light sources, a collector comprising a reflective surface configured to collect the rays of light emitted by the light source and reflect them as a beam of light; a portion of the optical projection system configured to project said beam of light; said portion being configured to form an image of the reflective surface of the collector and a second diffusing screen interposed between said portion of the optical projection system of this second submodule and of the collector of this second submodule and said portions of this second submodule is arranged adjacent to the portion of the first submodule of the second module.

The collector of the first submodule of the second module may comprise twelve sectors and the collector of the second submodule of the second module may comprise twelve sectors. For example, the first screen and the second screen extend over the entire length of the collector of the first submodule of the second module and of the collector of the second submodule of the second module. For example, the first screen and the second screen form a single component known as the second module screen.

Advantageously, the two submodules are adjacent along the one same horizontal line. Where appropriate, the collector of the first submodule of the second module and the collector of the second submodule of the second module may notably be positioned in continuity with one another. The front and rear faces of the screen of the second module may have a sinusoidal profile. Specifically, the front face has a concave feature at the collector of the first submodule of the second module and at the collector of the second submodule of the second module and has a convex feature at the junction between the collector of the first submodule of the second module and the collector of the second submodule of the second module, which is to say where the first screen and the second screen meet.

Advantageously, the second lighting module comprises a dividing wall arranged between the two submodules, said dividing wall extending beneath the mounting plate of the first heatsink. The dividing wall may be positioned parallel to the optical axis of the optical projection system. Alternatively or in addition, each submodule of the second lighting module comprises a diaphragm positioned between the screen of the second module and the optical projection system. For example, the diaphragm of the first submodule of the second module and the diaphragm of the second submodule of the second module form the one same single component referred to as the second module diaphragm. Said second module diaphragm is positioned perpendicular to the optical axis of the optical projection system. In one example, the first heatsink comprises the dividing wall and the second module diaphragm, forming a single component. The dividing wall and the second module diaphragm are situated on the opposite face of the first heatsink from the face comprising the plurality of light sources.

Advantageously, the first submodule is configured in such a way that the images of the sectors of its collector, which are formed by the first portion of the optical projection system, are superposed on and/or interlaced with the images of the sectors of the second collector of the second submodule which are formed by the second portion of the optical projection system.

Advantageously, the device comprises a second heatsink separating the second and third modules, wherein the light sources of the second lighting module are mounted on a second common support, said second support being a mounting plate of the second heatsink.

The second heatsink may comprise a mounting plate on which the light sources of the second lighting module are positioned and comprises fins in the continuity of the mounting plate.

Advantageously, the collectors of each submodule of the second module form a second single component, in that the screens of each submodule of the second module form a single component.

Where appropriate, the second single component may comprise at least one lateral fixing flange arranged at one end of the collector of the second module, notably of each collector of the lighting submodules of the second lighting module, and wherein the first screen comprises at least one lateral fixing member able to collaborate with the lateral fixing flange of the collector of the second lighting module. The lateral fixing flange of the collector of the second module is, for example, a slot. The lateral fixing member of the first screen is, for example, a pin or a stud. The pin or the stud of the screen is inserted into the slot of the collector so as to hold the first screen in position in front of the collector of the lighting module.

Where appropriate, the first screen and the second screen are positioned between the second single component comprising the collector of the first submodule of the second module and the collector of the second submodule of the second module, and the optical projection system. Thus, one of the faces of said screen of the second module can receive the beam of light reflected by the collector and that the other of the faces of said screen of the second module can project this said beam of light onto the optical projection system.

Advantageously, the third lighting module comprises a first submodule comprising the plurality of light sources, the collector, and said portion, and at least another submodule, characterized in that this submodule comprises a plurality of light sources, a collector comprising a reflective surface configured to collect the rays of light emitted by the light source and reflect them as a beam of light; a portion of the optical projection system configured to project said beam of light; said portion being configured to form an image of the reflective surface of the collector, and in that said portions of these other submodules are arranged adjacent to the portion of the first submodule of the third module.

For example, the third lighting module may comprise a first, a second and a third submodules, with the collector of the first submodule of the third module comprising six sectors, the collector of the second submodule of the third module comprising six sectors and the collector of the third submodule of the third module comprising eight sectors. If desired, the third lighting module comprises a plurality of dividing walls, each one arranged between two adjacent submodules of the third module, said dividing walls extending beneath the mounting plate of the second heatsink. The dividing walls may be positioned parallel to the optical axis of the optical projection system. As a preference, the second heatsink comprises the plurality of dividing walls.

Advantageously, the light sources of the second lighting module are mounted on a first face of the second common support and in that the light sources of the third lighting module are mounted on a second face, opposite to the first face, of the second common support.

For example, the plurality of dividing walls of the third module are situated on the face of the second heatsink, comprising the plurality of light sources of the third module and on the opposite face from the face comprising the plurality of light sources of the second module.

Advantageously, the collectors of each submodule of the third module form a third single component, forming a casing of the housing of the lighting device. This single component is referred to as the collector of the third module or third module collector.

Advantageously, the second heatsink comprises heat dissipating fins and in the second single component comprises an opening that opens onto said fins of the second heatsink and fixing members arranged in line with this opening and intended to collaborate with a fan.

The second single component comprises a sloping opening that opens onto the fins of the second heatsink. The sloping opening is able to direct the flow of air toward the fins and thus improve the dissipation of heat. The fins collect the heat diffused by the mounting plate from the light sources in order to dissipate said heat.

Advantageously, the cavity or cavities of the collector of the first module and the cavity or cavities of the collector of the third module are oriented in opposite directions and the cavity or cavities of the collector of the first module and the cavity or cavities of the second or third modules are oriented in identical directions.

Advantageously, the device comprises first fixing members configured to hold together the second single component and the third single component and second fixing members configured to hold together the third single component and the first single component.

For example, the fixing member of the second single component is a cap, and the fixing member of the third single component is a pin. Said pin and said cap collaborate with one another to hold the second single component and the third single component together.

Advantageously, the device comprises third fixing members positioned on first and third single components and collaborating with complementing fixing members belonging to the optical projection system.

For example, the third fixing members are a slot and a notch collaborating with one another in order to hold the optical projection system on the housing of the device.

Advantageously, each of the light sources of the second lighting module and/or each of the light sources of the third lighting module can be activated selectively, the device comprises a control unit configured to selectively control each of these selectively activatable light sources.

As a preference, each light source is made up of a plurality of light-emitting diodes, each light source can be activated selectively. In this example, the control unit selects the light source that is to be activated, for example, on the basis of the instructions received from a computer processor contained in the motor vehicle in which the lighting module is installed.

BRIEF DESCRIPTION OF THE DRAWINGS

Other advantages and features of the present invention will now be described using examples that are purely illustrative and by no means limit the scope of the invention, and on the basis of the accompanying drawings, in which the various figures show:

FIG. 1 schematically and partially depicts a view in perspective, from the front, of a lighting device according to one embodiment of the invention;

FIG. 2 schematically and partially depicts another view in perspective, from the front, of the lighting device of FIG. 1 with the optical projection system omitted;

FIG. 3 schematically and partially depicts a view in perspective, from above, of a first lighting module of the lighting device of FIG. 1;

FIG. 4 schematically and partially depicts a view in perspective, from above, of a second lighting module of the lighting device of FIG. 1;

FIG. 5 schematically and partially depicts a view in perspective, from above, of a third lighting module of the lighting device of FIG. 1;

FIG. 6 schematically and partially depicts a view in cross section of the lighting device of FIG. 1;

FIG. 7 schematically and partially depicts a view in perspective, from the rear, of the second lighting module of the lighting device of FIG. 1;

FIG. 8 depicts, in projection onto a vertical screen, an example of a beam of light emitted by the first lighting module of the lighting device of FIG. 1;

FIG. 9 depicts, in projection onto a vertical screen, an example of a beam of light emitted by the second lighting module of the lighting device of FIG. 1;

FIG. 10 depicts, in projection onto a vertical screen, an example of a beam of light emitted by the third lighting module of the lighting device of FIG. 1.

Throughout the following description, elements that are identical in terms of structure or in terms of function and that appear in various figures have been designated with the same reference sign, unless otherwise indicated.

DETAILED DESCRIPTION OF THE INVENTION

FIG. 1 depicts a motor vehicle lighting device 30 according to one embodiment of the invention. This lighting device 30 will be described in connection with FIG. 2, FIG. 3, FIG. 4, FIG. 5, FIG. 6 and FIG. 7, each of which depicts a view of a part of this lighting device 30, and in connection with FIG. 8, FIG. 9 and FIG. 10, each of which depicts an example of a beam of light liable to be emitted by this lighting device 30.

The lighting device 30 comprises three lighting modules 31, 32, 33 and on its front face has an optical projection lens 34. The lens 34 is formed as a single component common to the plurality of lighting modules 31, 32, 33, allowing the beams of light emitted by the plurality of light sources to be projected onto the road.

As shown in FIG. 2, the first lighting module 31 is positioned above the second lighting module 32, itself positioned above the third lighting module 33. The first lighting module 31 comprises a first submodule 31.1, referred to as central submodule, and a second and a third submodule 31.2 and 31.3, referred to as lateral submodules, which are aligned horizontally, so as to be adjacent to one another. The second lighting module 32 comprises a first submodule 32.1 and a second submodule 32.2, which are aligned horizontally, so as to be adjacent to one another. The third lighting module 33 comprises a first submodule 33.1, referred to as central submodule, a second submodule 33.2 and a third submodule 33.3, which are referred to as lateral submodules, which are aligned horizontally, so as to be adjacent to one another. In each of the lighting modules 31, 32, 33, two adjacent submodules comprise a common lateral edge.

Each of the lighting submodules 31.1, 31.2 and 31.3 comprises at least one light source (these are not depicted in the figures), a collector 31.11, 31.21 and 31.31 respectively, comprising a reflective surface configured to collect the rays of light emitted by said at least one light source and reflect them as a beam of light.

As shown in FIG. 3, the collector 31.11 is divided into five sectors, and the lighting submodule 31.1 comprises five light sources, each one associated with one of these sectors. In the collector 31.11, two adjacent sectors have a common lateral edge. In the example described, the plurality of sectors of the collector 31.11 are positioned transversely relative to one another. The sectors have a truncated parabolic profile each defining a cavity in which the light source is arranged.

The collectors 31.21 and 31.31 each comprise a single sector, and the submodules 31.2 and 31.3 each comprise a single light source (not depicted) which is associated with the respective collector 31.21 and 31.31.

Each sector of the collectors 31.11, 31.21 and 31.31 is positioned in such a way that it collects the beam of light emitted by the light source and reflects it toward the optical system 34. More specifically, each collector 31.11, 31.21 and 31.31 of a lighting submodule 31.1, 31.2 and 31.3 reflects this beam of light to a portion of the optical system 34, the portions being respectively 31.12, 31.22 and 31.32, and considered to form part of said lighting submodule 31.1, 31.2 and 31.3. This lens portion 31.12, 31.22 and 31.32 has a focal line f11, f12 and 13 respectively, passing through the rear edge of the collector 31.11, 31.21 and 31.31, so that this lens portion projects onto the road the image of this collector.

In the example described, the first central submodule 31.1 is therefore configured to form a beam of light having a substantially flat upper cut-off, depicted in FIG. 8. Each of the second and third lateral submodules 31.2 and 31.3 is configured to form a beam of light likewise having a substantially flat upper cut-off and having a horizontal spread and a maximum light intensity that are less than those of the beam liable to be emitted by the first central submodule 31.1. These two beams are, for example, intended to supplement the beam liable to be emitted by the first central submodule 31.1 to create functions of the motorway-driving beam or long-range beam type.

The collector 31.11 is positioned between the collectors 31.21 and 31.31. The collectors 31.11, 31.21 and 31.31 are formed by the one same first component 311 that forms a cover of the lighting device 30, as shown in FIG. 1.

The first lighting module 31 comprises a first heatsink 312. The first heatsink 312 comprises a mounting plate 312.1 acting as a common support for the plurality of light sources of the first lighting module 31 and comprises a plurality of heat-dissipating fins 312.2. The first heatsink 312 comprises on its upper face pins 312.3 which are intended to come into abutment in recesses 311.1 of the cover 311 so that the collectors 31.11, 31.21 and 31.31 can be indexed relative to the light sources.

The mounting plate 312.1 comprises a plurality of blocking members 312.4, each in the form of a triangular prism arranged in line with each of the light sources of the first module 31. The blocking members 312.4 are preferably shields to prevent direct light, referred to as parasitic light, from the light sources from passing through the optical system 34.

The rear part of the cover 311, opposite to the zone to which the optical system 34 is to be secured, comprises a recess, depicted in FIG. 3, in which the fins 312.2 of the first heatsink 312 are arranged.

Each of the lighting submodules 32.1 and 32.2 comprises at least one light source (these are not depicted in the figures), a collector, 32.11 and 32.21 respectively, comprising a reflective surface configured to collect the rays of light emitted by said at least one light source and reflect them as a beam of light, and a first and a second diffusing screen 321.1, 321.2 which is interposed between said collector 32.11 and 32.21 and the optical projection system 34.

The collectors 32.11 and 32.21 are divided into twelve sectors. The lighting submodules 32.1, 32.2 comprise twelve light sources (not depicted), each one associated with one of these sectors. In the collectors 32.11 and 32.21, two adjacent sectors have a common lateral edge. In the example described, the plurality of sectors of the collectors 32.11 and 32.21 are positioned transversely relative to one another. The sectors have a truncated parabolic profile each defining a cavity in which the light source is arranged. Each sector of the collectors 32.11 and 32.21 is positioned in such a way that it collects the beam of light emitted by the plurality of light sources and reflects said beam toward the optical system 34. More specifically, each collector 32.11 and 32.21 of the lighting submodules 32.1 and 32.2 reflects this beam of light toward a portion of the optical system 34, the portions being respectively 32.12 and 32.22, and considered to form part of said lighting submodule 32.1 and 32.2. This lens portion 32.12 and 32.22 has a focal line, f21 and f22 respectively, passing through the rear edge of the collectors 32.11 and 32.21, so that this lens portion projects onto the road the image of these collectors.

The collectors 32.11 and 32.21 are in the continuity of one another and form a second single component 323, as shown in FIG. 4.

The first diffusing screen 321.1 and the second diffusing screen 321.2 are positioned respectively in line with the collectors 32.11 and 32.21. The first and second screens 321.1 and 321.2 form a single component referred to as screen 321. The first and second screens 321.1 and 321.2 have a front face 321.3, facing toward the first and the second portion of the optical projection system 34, and a rear face 321.4 facing toward the collectors 32.11 and 32.21. Since the rear face 321.4 of the screen 321 faces toward the collectors 32.11 and 32.21, it is this face 321.4 that receives the beams of light passed on by said collectors 32.11 and 32.21. The front face 321.3 of the screen 321 faces toward said optical system 34, which is to say that it is this face 321.3 that projects the image of the collectors 32.11 and 32.21 onto the optical projection system 34. The front 321.3 and rear 321.4 faces have a succession of concave features and of convex features respectively. Each of the front and rear faces 321.3 and 321.4 are provided with a plurality of torus shapes. The screen 321 has an upper lip 321.5 projecting from the rest of said screen 321 toward the collectors 32.11 and 32.21, the screen 321 being configured so that said upper lip 321.5 adjoins the upper edge of the collectors 32.11 and 32.21. The lip 321 5 has a sinusoidal shape similar to the front 321.3 and rear 321.4 faces and coincides with the upper front edge of each collector 32.11 and 32.21.

The second single component 323 comprises at least one lateral fixing flange 323.1 arranged at one end of its reflective surface, and the screen 321 comprises at least one lateral fixing member 321.6 configured to collaborate with said lateral fixing flange 323.1 of the second single component 323. The lateral fixing flange 323.1 is a slot. The lateral fixing member 321.6 is a pin or a stud. The pin or the stud 321.6 is inserted into the slot 323.1 so as to hold the screen 321 in position in front of the collector 32.11 and 32.21.

In the example described, the first and second submodules 32.1 and 32.2 are thus configured to form a plurality of lighting segments each having substantially the shape of an inverted "T" having a horizontal spread. The screen 321 allows horizontal diffusion of each lighting segment formed from the image of each sector, and the lower part thereof, so as to obtain lighting segments having this particular inverted "T" shape. When all of the light sources of one of these submodules 32.1 and 32.2 are activated, the diffused lower portions of these lighting segments which are formed by this submodule become superimposed to form a segmented beam of light, as shown in FIG. 9.

The first submodule 32.1 is configured in such a way that the images of the sectors of the first collector 32.11, which are formed by a first portion of the optical projection system 32.12, are superposed on the images of the sectors of the second collector 32.21 of the second submodule 32.2 which are formed by a second portion 32.22 of the optical projection system 34. For example, each image formed by the second submodule 32.2 is superposed with at least one of the images formed by the first submodule 32.1, the set of images thus together forming a uniform beam of light.

The second lighting module 32 comprises a second heatsink 322. Said second heatsink 322 comprises a mounting plate 322.1 acting as a common support for the plurality of light sources of the second lighting module 32 and comprises a plurality of heat-dissipating fins 322.2. The second heatsink 322 comprises on its upper face pins 322.4 which are intended to come into abutment in recesses 323.2 of the second single component 323 so that the collectors 32.11 and 32.21 can be indexed relative to the light sources.

The lower face of the second heatsink 322, which is opposite to the face comprising the plurality of light sources, comprises a plurality of dividing walls 322.3 forming a lateral edge common to two adjacent submodules of the third lighting module 33.

The second single component 323 comprises a sloping opening 323.3 opening onto the fins 322.2 of the second heatsink 322, as depicted in FIG. 4. The second single component 323 comprises fixing members 323.5 arranged in line with said opening 323.3 and intended to collaborate with a fan (not depicted). The sloping opening is able to direct the flow of air toward the fan and thus improve the dissipation of heat. The opening 323.3 allows the dissipation of heat produced by the light sources of the second module 32.

The lower face of the first heatsink 312, opposite to the face comprising the plurality of light sources of the first module 31, comprises a diaphragm 312.5 positioned perpendicular to the optical axis of the optical projection system 34 and comprises a dividing wall 312.6 separating the first and second submodules of the second lighting module 32, as depicted in FIG. 1 and in FIG. 3. The first heatsink 312, the dividing wall 322.3 and the diaphragm 3125 form a single component.

Each of the lighting submodules 33.1, 33.2 and 33.3 of the third module 33 comprises at least one light source (these are not depicted in the figures), a collector 33.11, 33.21 and 33.31 respectively comprising a reflective surface configured to collect the rays of light emitted by said at least one light source and reflect them as a beam of light.

As shown in FIG. 5, the central collector 33.11 is divided into six sectors, and the lighting submodule 33.1 comprises six light sources, each one associated with one of these sectors. In the collector 33.11, two adjacent sectors have a common lateral edge. In the example described, the plurality of sectors of the collector 33.11 are positioned transversely relative to one another. The sectors have a truncated parabolic profile each defining a cavity in which the light source is arranged.

The collectors 33.21 and 33.31 comprise respectively six and eight sectors, and the submodules 33.2 and 33.3 comprise respectively six and eight light sources (not depicted) associated with the respective collector 33.21 and 33.31.

Each sector of the collectors 33.11, 33.21 and 33.31 is positioned in such a way that it collects the beam of light emitted by the light source and reflects it toward the optical system 34. More specifically, each collector 33.11, 33.21 and 33.31 of a lighting submodule 33.1, 33.2 and 33.3 reflects this beam of light to a portion of the optical system 34, the portions being respectively 33.12, 33.22 and 33.32, and considered to form part of said lighting submodule 33.1, 33.2 and 33.3. This lens portion 33.12, 33.22 and 33.32 has a focal line, f31, f32 and 33 respectively, passing through the rear edge of the collector 33.11, 33.21 and 33.31, so that this lens portion projects onto the road the image of this collector.

In the example described, each of the first, second and third submodules 33.1, 33.2 and 33.3 is thus configured to form a segmented beam of light each segment of which can be controlled selectively, as depicted in FIG. 10.

The collector 33.11 is positioned between the collectors 33.21 and 33.31. The collectors 33.11, 33.21 and 33.31 are formed by the one same third component 330 that forms a casing of the lighting device 30, as shown in FIG. 1 and in FIG. 5.

In the third module 33, two adjacent submodules have a common lateral edge 322.3, said lateral edge 322.3 forming a single component with the second heatsink 323, as depicted in FIG. 5.

The cavity or cavities of the collectors 31.11, 31.21 and 31.31 and the cavities of the collectors 33.11, 33.21 and 33.31 are oriented in opposite directions and the cavity or cavities of the collectors 31.11, 31.21 and 31.31 and the cavities of the collectors 32.11 and 32.21 are oriented in identical directions.

The light sources of the second lighting module 32 are mounted on a first face of the second common support 322.1 and in that the light sources of the third lighting module 33 are mounted on a second face, opposite to the first face, of the second common support 322.1.

The second single component 323 comprises two recesses 323.2 in which a pin 330.1 of the casing 330 becomes lodged in order to hold said second single component 323 and said casing 330 together.

The cover 311 and the casing 330 each comprise second fixing members 311.2, 330.1, these being respectively caps 311.2 and pins 330.1 depicted in FIG. 2. Said caps 311.2 and said pins 330.1 collaborate with one another to hold said cover 311 and said casing 330 together. The second single component 323 and the casing 330 each comprise first fixing members 323.4, 330.1, these being respectively caps 323.4 and pins 330.1 depicted in FIG. 2. Said caps 323.4 and said pins 330.1 collaborate with one another to hold said second single component 323 and said casing 330 together.

The front part of the cover 311 comprises a slot 3111 for securing the optical system 34. The casing 330 comprises a slot 330.2 able to collaborate with the notch 340 of the optical system 34. The lens comprises at least one notch 340 collaborating with at least the slot 3111 of the housing.

The device therefore comprises the first lighting module 31 configured to emit the first beam of light with a flat cut-off, the second lighting module 32 configured to emit the second beam of light extending at least partially above the first beam of light, and the third lighting module 33 configured to emit the segmented beam of light each segment of which can be controlled selectively, the third beam of light extending at least partially above the second beam of light.

The foregoing description explains clearly how the invention is able to achieve its stated objectives, namely use a device comprising several lighting modules that it is desired to be superposed, for example for esthetic reasons, in a device that is compact, by proposing a motor vehicle lighting device comprising a plurality of lighting modules and a diffusing screen.

In any event, the invention should not be regarded as being limited to the embodiments specifically described in this document, and extends, in particular, to any equivalent means and to any technically operative combination of these means.

What is claimed is:

1. A motor vehicle lighting device, said device comprising a housing in which there is an arrangement of at least:

a. a first lighting module designed to emit a first beam of light with an upper cut-off, b. a second lighting module designed to emit a second beam of light extending at least partially above the first beam of light;

c. a third lighting module designed to emit a third beam of light that is segmented, where each sector that is segmented is configured to be controlled selectively, the third beam of light extending at least partially above the second beam of light;

d. an optical projection lens common to the first, second and third lighting modules including a plurality of portions;

e. the second lighting module is arranged in the housing below the first lighting module;

f. the third lighting module is arranged in the housing below the second lighting module where each of the first, second and third lighting modules includes:

i. A plurality of light sources;

ii. a collector including a reflective surface configured to collect a number of light rays emitted by the plurality of light sources reflected as a beam of light; and g. a portion of the plurality of portions of the optical projection lens being configured to project the beam of light reflected by the collector, where shapes of the plurality of portions along the optical projection lens align with openings from a number of dividing walls in contact with the optical projection lens from a first submodule.

2. The motor vehicle lighting device of claim 1, wherein the collector of each of the first, second and third lighting modules includes a plurality of sectors, where each sector is configured to collect and reflect the rays of light emitted by light sources of each module that each sector is associated, the portion of the optical projection lens configured to form an image of each sector.

3. The motor vehicle lighting device of claim 2, wherein each sector of the collector of each of the first, second and third lighting modules has a rear edge and wherein the portion of the optical projection lens has a focal line situated in the vicinity of the rear edges of the plurality of sectors of the collector of each module such that the image of each sector formed by the portion has an upper cut-off that is formed by the rear edge of an associated sector.

4. The motor vehicle lighting device of claim 1, wherein the first lighting module includes the first submodule including the plurality of light sources, the collector, the portion, and two other submodules which are arranged one on each side of the first submodule of the first module;

wherein each of these submodules includes a light source, a collector with a reflective surface configured to collect the rays of light emitted by the light source and reflect them as a beam of light; a portion of the optical projection lens configured to project the beam of light;

the portion being configured to form an image of the reflective surface of the collector such that portions of the optical projection system of the at least other submodules are arranged one on each side of the portion of the optical projection lens of the first submodule of the first module.

5. The motor vehicle lighting device of claim 4, wherein the respective collectors of each submodule of the first module form a first single component and form a cover of the housing of the lighting device.

6. The motor vehicle lighting device of claim 4, further including a first heatsink separating the first and second modules, wherein the light sources of each of the submodules of the first lighting module are mounted on a first common support, said first support being a mounting plate of the first heatsink.

7. The motor vehicle lighting device of claim 6, further including a second heatsink separating the second and third lighting modules, wherein the light sources of the second lighting module are mounted on a second common support, the second common support being a mounting plate of the second heatsink.

8. The motor vehicle lighting device of claim 7, wherein the light sources of the second lighting module are mounted on a first face of the second common support such that the light sources of the third lighting module are mounted on a second face, opposite to the first face, of the second common support.

9. The motor vehicle lighting device of claim 1, wherein the second lighting module includes a first diffusing screen interposed between the portion of the optical projection lens of the second lighting module and the collector of the second lighting module.

10. The motor vehicle lighting device of claim 9, wherein the second lighting module includes a first submodule including the plurality of light sources, the collector, the first screen and the portion, and at least a second submodule;

wherein the second submodule includes a plurality of light sources, a collector including a reflective surface configured to collect the rays of light emitted by the light source and reflect them as a beam of light;

a portion of the optical projection lens configured to project the beam of light; the portion being configured to form an image of the reflective surface of the collector and a second diffusing screen interposed between the portion of optical projection lens of this second submodule and of the collector of this second submodule and in that the portion of this second submodule is arranged adjacent to the portion of the first submodule of the second lighting module.

11. The motor vehicle lighting device of claim 10, wherein the collectors of each submodule of the second module form a second single component, and in that the diffusing screens of each submodule of the second lighting module form a single component.

12. The motor vehicle lighting device of claim 11, wherein the third lighting module includes a first submodule including the plurality of light sources, the collector, and the portion, and at least another submodule, where the at least other submodule includes a plurality of light sources;

a collector including a reflective surface configured to collect the rays of light emitted by the light source and reflect them as a beam of light;

where a portion of optical projection lens is configured to project the beam of light, the portion being configured to form an image of the reflective surface of the collector such that portions of the at least other submodules are arranged adjacent to the portion of the first submodule of the third lighting module.

13. The motor vehicle lighting device of claim 12, wherein the collectors of each submodule of the third lighting module form a third single component forming a casing of the housing of the lighting device.

* * * * *